March 13, 1934.                J. L. BIGGS                 1,950,772
                          MOLD FOR FOOD PRODUCTS
                           Filed Aug. 17, 1931          2 Sheets-Sheet 2
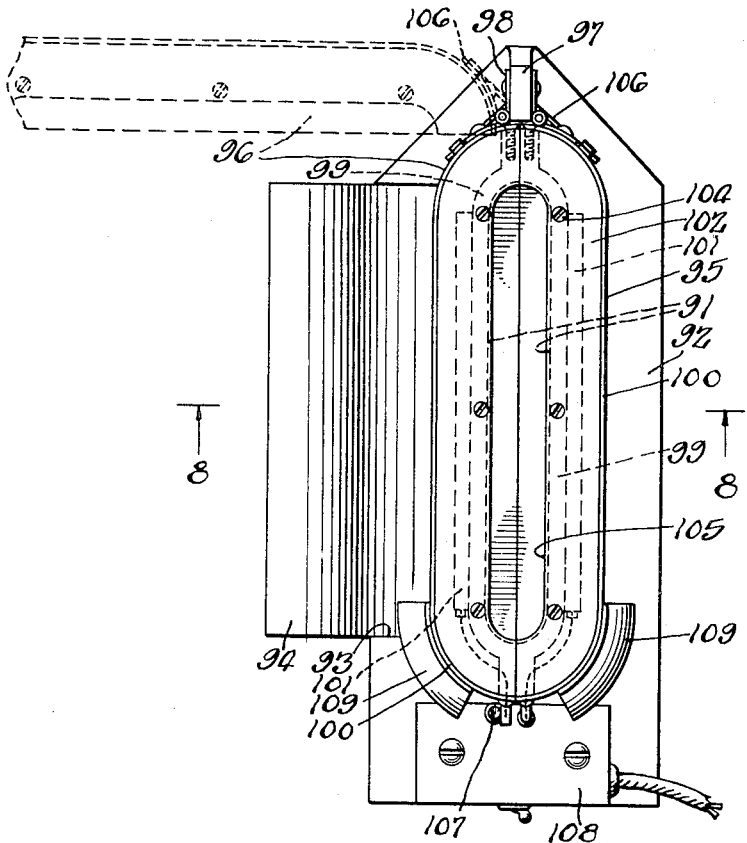
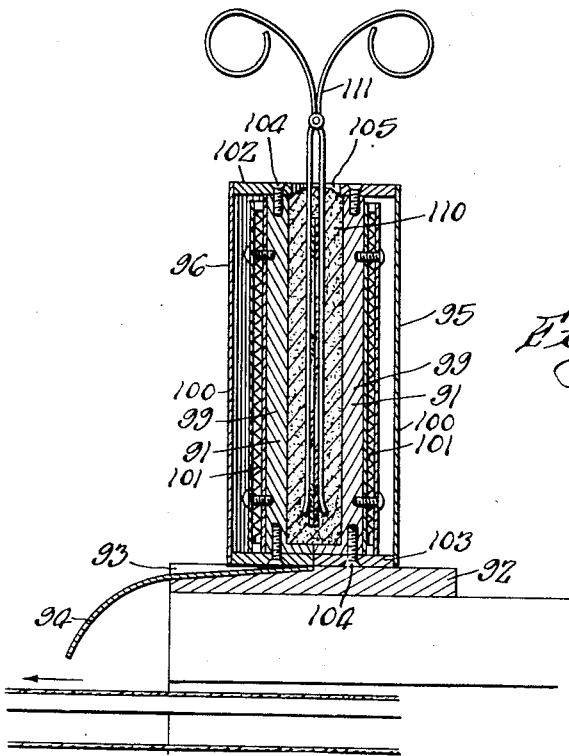
Inventor:
John L. Biggs
By [signature]
Atty.

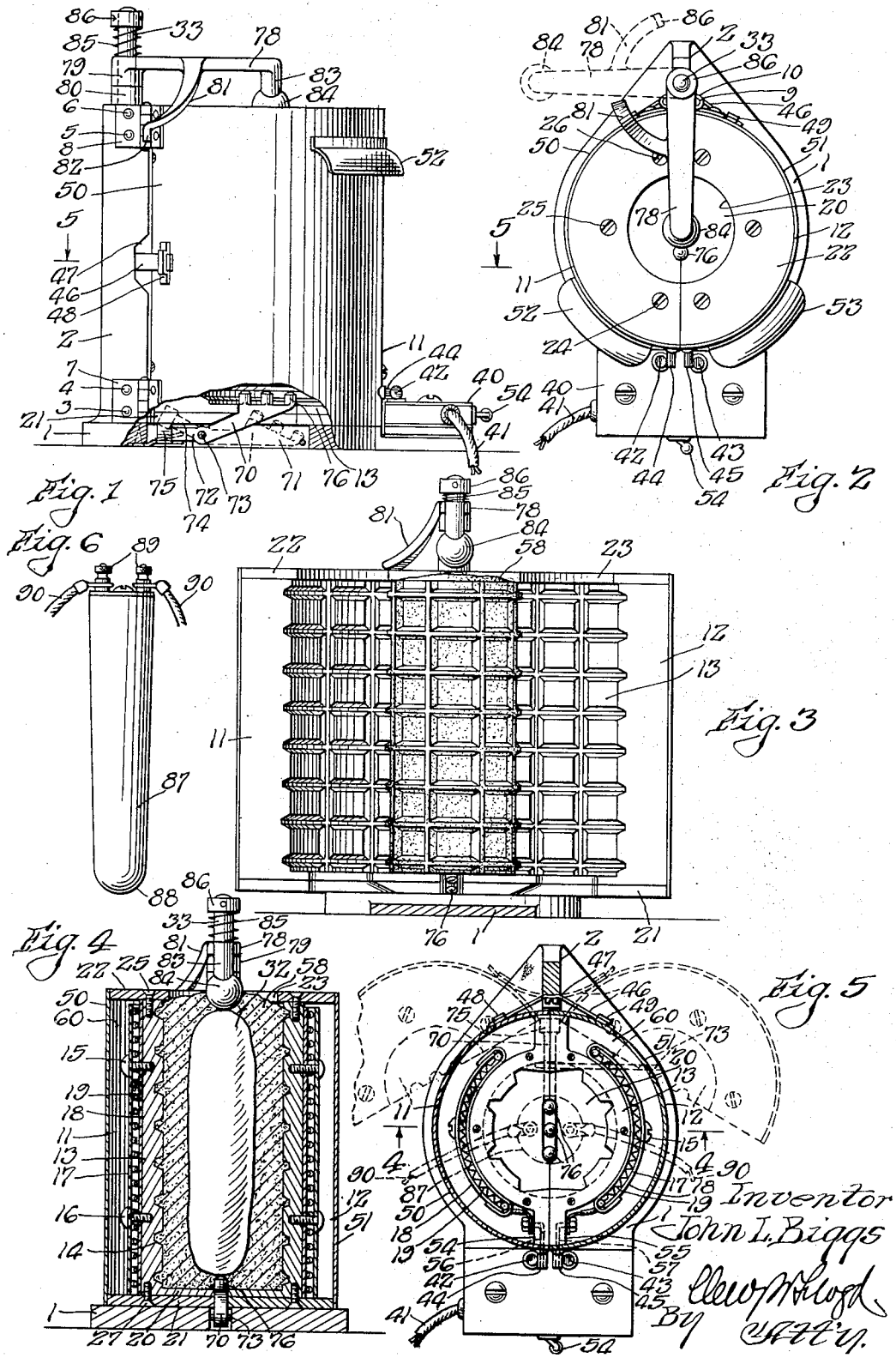

Patented Mar. 13, 1934

1,950,772

UNITED STATES PATENT OFFICE 1,950,772

MOLD FOR FOOD PRODUCTS

John L. Biggs, Chicago, Ill.

Application August 17, 1931, Serial No. 557,520

8 Claims. (Cl. 107—66)

This invention has to do with a food product and with a mold to bake such or similar products.

The art of preparing appetizing and properly cooked foods has established a constant trend toward improvement. People have accepted generally methods of preparing foods advocated by science. The fact that food is prepared in a way to make it appeal from appearance also makes it more palatable. Such objections have been followed closely by those interested in the science of cookery, i. e., the food is cooked by electricity, a modern heat and in a sanitary and cleanly mold.

One object of the present invention is to produce a device for baking a batter into an appetizing and thoroughly palatable form.

Another object of the invention is to provide a device for baking a batter around other food to provide a container therefor, and by so doing to heat or partly cook the enclosed food.

A third object of the present invention is to produce a device for baking a batter into a distinguishing and convenient shape.

These objects and such other objects as appear in the description which follows are due to the novel arrangement and unique construction of the elements comprising the device and illustrated in the two sheets of drawings hereby made a part of this specification and in which:

Figure 1 is a side elevation of a mold embodying the invention;

Figure 2 is a plan view of the top of the mold shown in Figure 1;

Figure 3 is an elevation of the front of the mold in an open position and containing a finished food product;

Figure 4 is a sectional elevation of the mold taken on the lines 4—4 of Figure 5;

Figure 5 is a sectional view of the mold taken on the lines 5—5 of Figure 1;

Figure 6 is an auxiliary heating unit shown in perspective;

Figure 7 is a plane view of another form of the invention taken from the top; and Figure 8 is a sectional view taken at line 8—8 in Figure 7.

Like reference characters refer to the same parts throughout the drawings and following description.

By referring to Figure 1, it will be observed that the device may include a base 1 preferably of a metal material which may be cast integral with an upright post 2. The post 2 is of a rectangular cross section, as best illustrated in Figure 5, and is drilled entirely through to receive rivets 3, 4, 5 and 6, to secure strap hinges 7, 8, 9 and 10 thereto.

To the swinging leaves of the hinges are attached two symmetrical half sections 11 and 12 forming the mold. The half sections 11 and 12 abut on a centrally located vertical plane extending from front center to back, said sections open to the position indicated by dotted outline in Figure 5 by swinging on hinges 7, 8, 9 and 10. The bottom section of each half section 11 and 12 is enclosed by a semicircular plate 21, and the top is covered by a similar plate 22 with a semicircular section 23, formed about a common central axis as plate 22, and removed to form a round hole when the two half sections are abutting.

It is not imperative that the opening to the mold formed by the plates 22 be round. It may be of any configuration so long as it is a window opening, i. e., an unobstructed opening having a continuous single border or edge.

Each half section 11 and 12 contains a metal heating plate 13 secured to end plate 22 by screws 24, 25 and 26 and to end plate 21 by an equal number of oppositely disposed screws of which number screw 27 is exposed. Each plate is semicircular in shape with the inner surface scored by transverse trenches of cross section as indicated by 14, (Figure 4) and spaced to form a grating as exposed in Figure 3. Integral with the bottom of each plate is a semicircular plate 20. To the outer surface of each heating plate is attached, by means of screws 15 and 16, a heating unit 17, which in the present embodiment composes a flat semicircular pocket 18 containing resistance wires 19 heated by an electric current passing therethrough. The heat of the units 17 is imparted to the heating plates.

Space is provided between heating unit 17 and casing 50 to dispose an insulating material 60, such as asbestos, to prevent heat developed in unit 17 from being dissipated any way except through the heating plate.

A lever 70 is anchored in a pivotal manner within a slot 71 centrally located in base 1. Angular lever 70 has an elbow 72 to receive pin 73 about which it is free to rotate. Near the back of the slot and integral of semicircular end plate 21 is a camming surface 74 which contacts the upper surface of lug 75 on the shorter end of lever 70. The longer and front end of angular lever 70 terminates into three upwardly directed prongs 76 in direct alignment, and with the center prong centrally located to the mold.

The upper end of upright post 2 may be turned in a lathe or otherwise to form a pivot post 33. Secured to pivot post 33 is a horizontal arm 78, to be measurably spaced above the mold by offset shank 79 in contact with shoulder 80 at the bottom of post 33. Projecting laterally and downwardly from arm 78 is a member to form a cam 81 which contacts the shoulder of casing 50 to be operated thereby and to lift arm 78 as the mold is opened. A lug 82 may be projected from the lower end of cam 81 to engage the side of casing 50 to facilitate removing arm 78 to the position shown in dotted outline (Figure 2) upon the opening of the mold. Arm 78 is of such length that the front end thereof is directly over the center of the mold, and pending downwardly from the said end is a short stem 83 terminating in a ball 84. Also on post 33 will be observed a compression spring 85 intermediate a nut 86 and the shank of arm 78 to effect arm 78 to remain in its lower position.

A pressed steel box 40 contains a time switch element supplied with electric current by the conductors in a braided duplex cable 41, and which operates beveled contact catches 42 and 43 to move forward to disengage lug contacts 44 and 45 to thus allow leaf spring 46 to return to position shown in dotted outline and by such movement to swing the mold to the open position as shown in dotted outline.

Contact lugs 44 and 45 are insulated electrically from metal lips 54 and 55 projecting from iron plates 13, as are the electric conductors 56 and 57 carrying through to the heating elements.

It will be noted in Figure 1 that spring 46 passes through aperture 47 in upright post 2 to engage the ends thereof in buckles 48 and 49 which are riveted to the side of casings 50 and 51 respectively.

To the upper front sides of casings 50 and 51 are handles 52 and 53 to assist in closing the mold. Handle 54 is attached to a small lever to throw and snap a toggle switch to interrupt the electric power circuit before it reaches the time switch.

By grasping handles 52 and 53 the mold is forced against the effort exerted by spring 46, to a closed position where it is locked by contact catches 42 and 43 blocking the way of contact lugs 44 and 45.

Swinging the two halves of the mold together in this manner provides a cavity with a small opening at the top coformed by the semicircular sections 23. By way of this opening the cavity enclosed by the curved plates 13 is now partly filled with a batter 58. A weiner is inserted into the mold through the top opening, and pushed downwardly through the batter 58 preferably until an end thereof rests upon a prong 76. Next the arm 78 is rotated about the post 33 from the position as shown in dotted outline in Figure 2, to bring the ball 84 in vertical axial relation to the top cavity opening, and in contact with the upper end of the weiner. The spring 85 holds the ball 84 in positive engagement with the weiner, and the axial movement allowable of the arm 78 along the post 33 makes it possible to suitably accommodate weiners in deviation of standard length.

With the cavity containing the batter and other food product in the above described manner, the handle 54 is thrown to the "on" position. Time switch within box 40 is preset to engage beveled contacts 42 and 43 from lug contacts 44 and 45 after a period of time required to bake batter 58 (which fills the mold by expansion), to permit the urge of spring 46 to open the mold.

As the opposed elements are opened by the spring 46, the camming surface 74 releases the lug 75 so that the end of the lever 70 configuring the prongs 76 may drop downwardly. Subsequently and incident to a further opening of the elements 11 and 12, the upper edge of the casing 50 on the element 11 comes in sliding contact with the under side of the cam part 81 to thereby elevate the arm 78 by sliding said arm upwardly upon the post 33. After the ball 84 has been elevated from engagement of the weiner, a continued outward movement of the shoulder of casing 50 brings it in contact with the lug 82, to thereby rotate the arm 78 to the position shown in dotted outline, Figure 2. Since the prongs 76 cannot drop from out of the lower end of the cooked product until after the plates 13 have been released therefrom, the product is held against clinging to either plate, and after the mold is opened is left sitting on an end upon the base 1.

In this mold, there has been cooked or baked into the product, weiners, cheese, chicken and squares of beef and of pork, also, such fruits as bananas and strawberries all with remarkable results.

The mold heats the batter to generate steam from the moisture therein, which steam cooks the food product thoroughly by passing therethrough to escape by way of the small opening above. The success of this device depends upon the heating plates 13 and top semicircular plates 22 to form a solid wall around the batter, that when heated, said batter will expand to form a seal between itself and said heating plates and said semicircular plates that any steam generated within the batter cooking cannot escape therebetween. By this continued confinement within the batter of the steam it becomes slightly superheated which factor is necessary to cook the batter into a light fluffy product. Finally, when most of the moisture has left the product, heating plates 13 brown and crisp the surface in contact therewith.

Attention is next directed to Figure 6 in which a heating unit 87 is illustrated. This unit is of a circular cross section, uniformly graduated, and comprises a rounded lower end 88. At the top of this unit 87 will be noted two binding posts 89 which are electrically connected to an internal resistor and heating element. Leads 90 are incorporated into a twisted lamp cord or other suitable conductor to reach a source of electrical energy as an ordinary lighting socket.

The auxiliary heating unit 87 above described is to insert within the mold as shown in Figure 5 in dotted outline. This heating element will be so inserted when it is not desired to place meat or other edible food within the batter and to facilitate crisping both on inner and outer surface of the resulting product.

Figure 7 shows a modified embodiment of the invention and with the iron heating plates 91 to form a flat elliptical enclosure rather than cylindrical. This form rests upon a base 92 which has to its left side a cutaway section 93 to slope downwardly and outwardly from the center thereof. In the bottom of cutaway section 93 lies a plate or platform member 94 to extend outwardly and downwardly from the outer edge of the base; its utility to be explained more in detail later.

This embodiment comprises two identical elements as observed mounted upon base 92 to abut upon center line extending from front to rear. The element 95 and to the right, is to be held stationary while the element 96 to the left is pivoted to a back vertical standard 97 by hinges 98 to permit swinging in horizontal manner to the position shown in dotted outline.

Each element contains a heating plate 99, an outer shell 100 and a heating element 101 intermediate said heating plate and said shell in a similar manner to the aforedescribed embodiment. A top plate 102 coacts with a bottom plate 103 and which are secured to shell 100 to hold by means of machine screws 104 the plate 99 and attached heating unit 101 within the shell. The upper plates 102 are so formed as to leave an opening 105 in the top of the mold.

Leaf spring 106 extends through an opening provided in standard 97 to be attached to the shell of elements 95 and 96 that said elements will be abutted against the effort of said spring. Hence when latch 107 is actuated, the effort of the spring 106 will swing the element 96 into the open position. A time switch mechanism 108 may be provided to the device as shown, if desired, by which latch 107 can be operated. Convenient handles 109 are attached to the shell of the elements which may be used to assist in closing, or in opening the mold if time switch element 108 is not employed.

This particular form of mold does not provide an arm thereabove to support solid edible substances in a vertical manner. It is the purpose of this embodiment to bake a product of a flat nature and to contain within it thin strips or slices of meat or other substance incapable of rigidly supporting itself. Therefore the mold will be filled with batter 110 and previous to inserting aforementioned thin slices of meat by means of suitable tweezers 111 when the batter will support said meat.

After the product has been thoroughly baked and element 96 is automatically or otherwise swung to the open position, it will fall to be caught upon platform plate 94, and directed thereby to a suitable or desired container.

The above description is of the preferred embodiments of the invention, however, it is to be understood that the device may be manufactured without the time switch arrangement; also without the electrical heating elements and to adopt the mold to bake food products by conduction and convection of heat from a stove or other source of heat.

What I claim is new and I desire to secure by Letters Patent of the United States is:

1. In a cooking mold, a cylindrical cup formed of sections, each section comprising a heating plate, and parts projecting from said plates and providing notches, the sections being relatively movable and having a common vertical axis, said sections being arranged when in closed position to have their edges and the edges of said projecting parts abut whereby the notches are in opposed relation forming a window opening to said cup, the parts having said notches therein being in a plane normal to the axis of said opening.

2. In a cooking mold, heating plates in combination with end plates having notches, said heating plates being adapted to form an enclosure, and said end plates being normal to said heating plates to project over an end of such enclosure, the plates at their notched portion combining one with another to form a window opening to said enclosure.

3. In a mold for cooking a batter, the combination of a heating plate providing an enclosure, an arm thereabove, and a base below having a pin to extend up into the enclosure and to coact with a lug projecting downwardly from said arm to support, within said batter, a solid article of food or other substance therebetween.

4. In a cooking mold having an enclosure and a window opening for said enclosure, the combination of heating plates comprising sections disposed to pivot about a common vertical axis, and of complemental plates on an end thereof and having notches within an edge, said sections having their longitudinal edges abutting to form said enclosure, and said complemental plates having said notched edges to abut to place said notches in opposed relation thereby forming said window opening, said plates being disposed in a plane normal to the axis of said opening.

5. A cooking device comprising plates adapted to be moved from an open position to a closed position, said plates when in closed position forming the side walls and bottom of a generally vertical chamber adapted to receive a batter, pins projecting into said chamber from the bottom thereof, and means independent of said plates for anchoring said pins, said pins extending into batter in said chamber and holding the cooked batter upright free from the support of said plates when the latter are moved apart.

6. A cooking device comprising a vessel, a base below said vessel, a slender vertical pin, projecting upwardly from said base, and cooking plates on said base to form the bottom of said vessel and adapted to fit closely about said pin with a portion of the latter projecting into the vessel.

7. A cooking mold having a base and comprising movable heating plates commonly pivoted about a vertical axis, there being a section at the bottom of said plates projecting normal thereto and having notches therein, and a supporting member secured in said base and immovable within a plane normal to said axis, said plates and bottom sections being adapted to movement about said axis, into abutted relationship to form a cup, said notches co-forming an aperture in the bottom of said cup, and said supporting member projecting through said aperture into said cup.

8. A cooking mold having a cavity and comprising complemental heating plates movable to one another, parts extending normally from an edge of said plates and having notches therein, said plates being adapted for assembly to enclose said cavity with said notches forming a window opening thereto, and said parts, forming a flange, circumscribing said opening in a plane normal to the principal axis of said opening.

JOHN L. BIGGS.